United States Patent
Yea et al.

(10) Patent No.: US 8,189,943 B2
(45) Date of Patent: May 29, 2012

(54) METHOD FOR UP-SAMPLING DEPTH IMAGES

(75) Inventors: Sehoon Yea, Cambridge, MA (US);
Kwan-Jun Oh, Gwangju (KR);
Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 698 days.

(21) Appl. No.: 12/405,884

(22) Filed: Mar. 17, 2009

(65) Prior Publication Data

US 2010/0239187 A1    Sep. 23, 2010

(51) Int. Cl.
*G06K 9/42* (2006.01)

(52) U.S. Cl. ........ 382/257; 382/256; 382/258; 382/259; 382/260; 382/261; 382/262; 382/263; 382/264; 382/232; 382/298

(58) Field of Classification Search .......... 382/256–264, 382/232, 298
See application file for complete search history.

(56) References Cited

U.S. PATENT DOCUMENTS

| | | | | |
|---|---|---|---|---|
| 5,666,434 A * | 9/1997 | Nishikawa et al. | ........... | 382/128 |
| 5,724,454 A * | 3/1998 | Shimazu et al. | ........... | 382/258 |
| 5,848,189 A * | 12/1998 | Pearson et al. | ........... | 382/218 |
| 5,867,605 A * | 2/1999 | Oliveras et al. | ........... | 382/260 |
| 5,926,555 A * | 7/1999 | Ort et al. | ........... | 382/124 |
| 6,091,841 A * | 7/2000 | Rogers et al. | ........... | 382/132 |
| 6,185,320 B1 * | 2/2001 | Bick et al. | ........... | 382/132 |
| 6,192,160 B1 * | 2/2001 | Sunwoo et al. | ........... | 382/257 |
| 6,195,659 B1 * | 2/2001 | Hyatt | ........... | 1/1 |
| 6,269,194 B1 * | 7/2001 | Nichani | ........... | 382/270 |
| 6,487,317 B1 * | 11/2002 | Small | ........... | 382/240 |
| 6,741,755 B1 * | 5/2004 | Blake et al. | ........... | 382/284 |
| 6,813,373 B1 * | 11/2004 | Suri et al. | ........... | 382/128 |
| 6,816,627 B2 * | 11/2004 | Ockman | ........... | 382/284 |
| 7,684,956 B2 * | 3/2010 | Dahlen et al. | ........... | 702/155 |
| 7,813,580 B2 * | 10/2010 | Lee et al. | ........... | 382/257 |
| 8,073,286 B2 * | 12/2011 | David et al. | ........... | 382/275 |
| 2002/0150304 A1 * | 10/2002 | Ockman | ........... | 382/260 |
| 2003/0086616 A1 * | 5/2003 | Oh et al. | ........... | 382/209 |
| 2003/0095696 A1 * | 5/2003 | Reeves et al. | ........... | 382/131 |
| 2003/0169946 A1 * | 9/2003 | Bamford et al. | ........... | 382/308 |
| 2003/0202713 A1 * | 10/2003 | Sowa | ........... | 382/260 |
| 2004/0208390 A1 * | 10/2004 | Jiang et al. | ........... | 382/260 |
| 2005/0271270 A1 * | 12/2005 | Hsieh et al. | ........... | 382/170 |
| 2006/0215186 A1 * | 9/2006 | Ernst et al. | ........... | 358/1.2 |

(Continued)

FOREIGN PATENT DOCUMENTS

WO    WO 0019372 A1 *    4/2000

OTHER PUBLICATIONS

View generation—FTV, Mori et al., Elsevier, 0923-5965,2009, pp. 65-72.*
Efficient Dilation—Algorithms, Gil et al., IEEE, 0162-8828,2002, pp. 1606-1617.*
Morphological filters—filters, Maragos et al., IEEE, 0096-3518-1987, pp. 1170-1184.*

(Continued)

*Primary Examiner* — Jayesh A Patel

(74) *Attorney, Agent, or Firm* — Dirk Brinkman; Gene Vinokur

(57) ABSTRACT

A method up-samples images in a reduced resolution video, wherein each image I(x, y) stores depths d at pixel locations (x, y). each depth image is scaled up to produce a corresponding up-scaled image. Then, image dilation, a median filter, image erosion, and a min-max filter are applied in order to produce a corresponding up-sampled image.

9 Claims, 15 Drawing Sheets

U.S. PATENT DOCUMENTS

| | | | |
|---|---|---|---|
| 2007/0133862 A1* | 6/2007 | Gold et al. | 382/149 |
| 2007/0173744 A1* | 7/2007 | Lai et al. | 600/587 |
| 2008/0273787 A1* | 11/2008 | Ducksbury et al. | 382/133 |
| 2009/0034867 A1* | 2/2009 | Rempel et al. | 382/264 |
| 2010/0111370 A1* | 5/2010 | Black et al. | 382/111 |
| 2010/0238160 A1* | 9/2010 | Yea et al. | 345/419 |
| 2010/0239180 A1* | 9/2010 | Yea et al. | 382/261 |

OTHER PUBLICATIONS

Image denoising—filter, Zhu et al., IEEE, 978-1-4244-2144-5, 2008, pp. 3985-3989.*

Applications—processing, Maragos et al., IEEE, CH2243-4, 1986, pp. 2067-2070.*

* cited by examiner

200

310

320

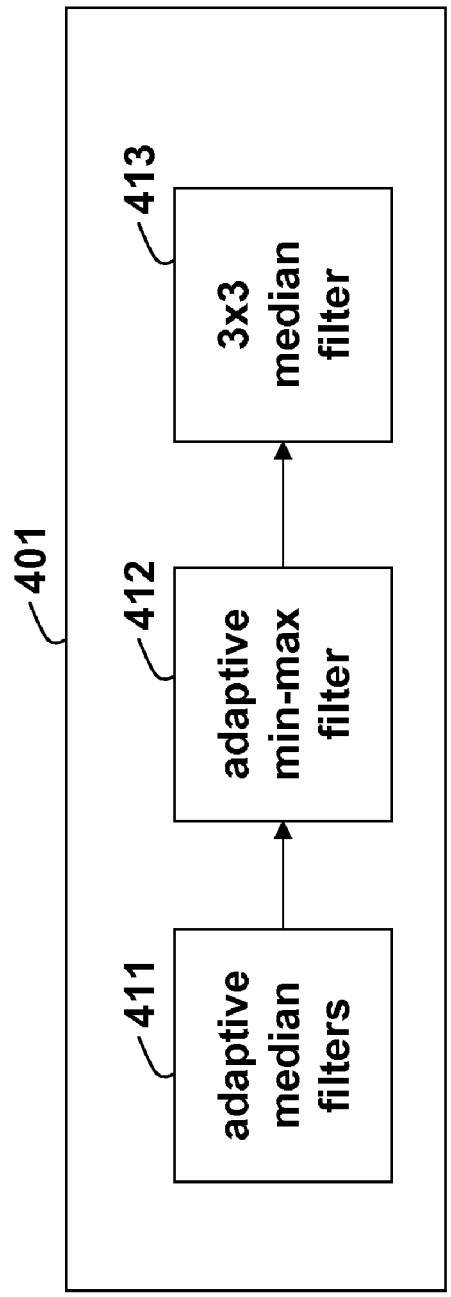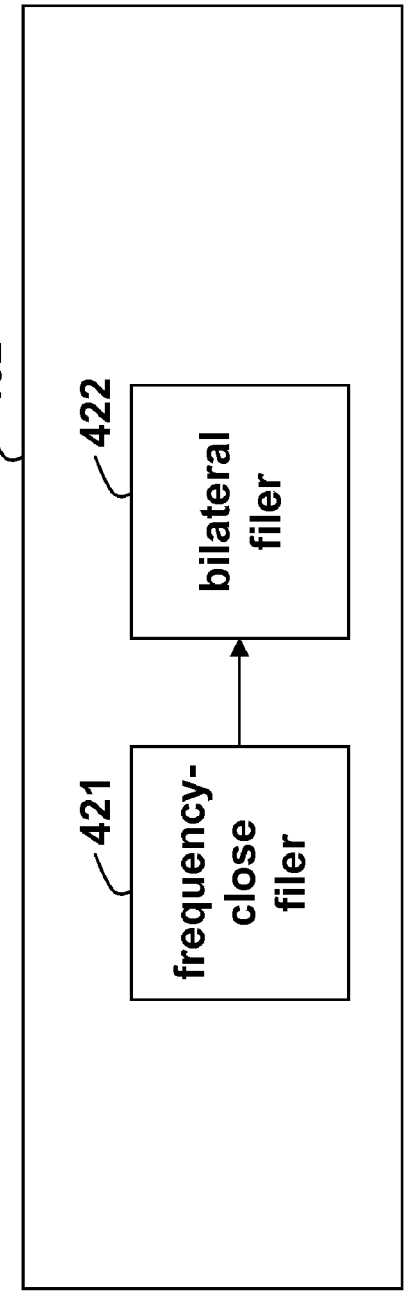

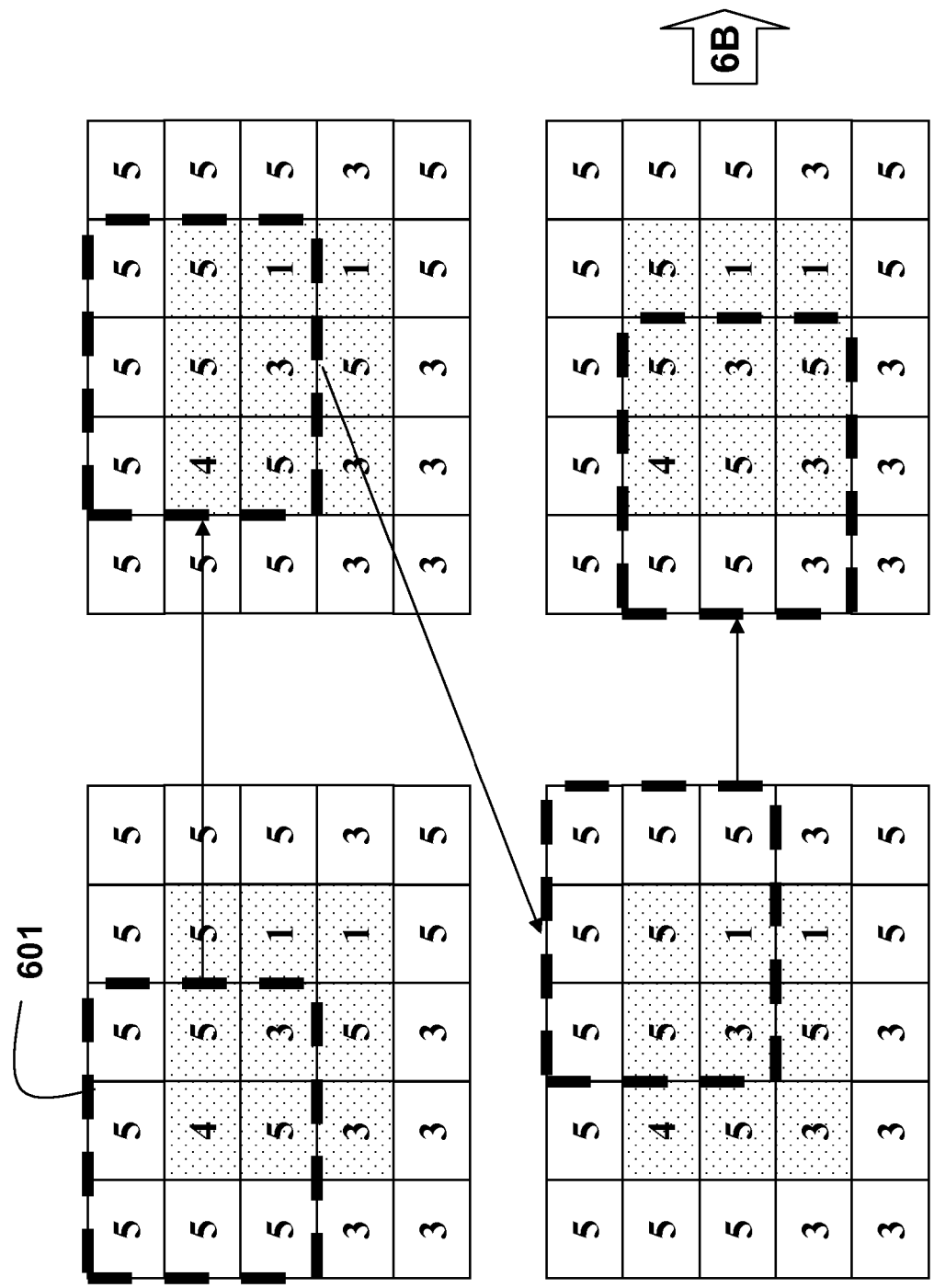

800

METHOD FOR UP-SAMPLING DEPTH IMAGES

RELATED APPLICATIONS

The following Non-Provisional Patent Applications, co-filed herewith are related to this Application, and incorporated herein by reference: U.S. Non-Provisional patent application Ser. No. 12/405,864, "Depth Reconstruction Filter for Depth Coding Videos," filed by Yea et al. on Mar. 17, 2009; and U.S. Non-Provisional patent application Ser. No. 12/405,912, "Method for Virtual Image Synthesis" filed by Yea et al. on Mar. 17, 2009 and incorporated herein by reference.

FIELD OF THE INVENTION

This invention relates generally to image processing, and more particularly to up and down sampling videos.

BACKGROUND OF THE INVENTION

Depth Images

Depth images represent distances from a camera to scene elements in 3D space. Efficient encoding of depth images is important for 3D video and free view television (FTV). FTV allows user to interactively control the view and generate new virtual images of a dynamic scene from arbitrary 3D image points.

Most conventional image-based rendering (IBR) methods use depth images, in combination with stereo or multi-image videos, to enable 3D and FTV. The multi-image video coding (MVC) extension of the H.264/AVC standard supports inter-image prediction for improved coding efficiency for multi-image videos. However, MVC does not specify any particular encoding for depth images.

Efficient estimation and encoding of depth are crucial to enable high-quality virtual image synthesis at the decoder.

Depth Reconstruction Filter

Unlike conventional images, depth images are spatially monotonous except at depth discontinuities. Thus, decoding errors tend to be concentrated near depth discontinuities, and failure to preserve the depth discontinuities leads to the significantly compromised qualities of virtual images, see FIGS. 6A-6B.

Down/Up Sampler

Encoding a reduced resolution depth can reduce the bit rate substantially, but the loss of resolution also degrades the quality of the depth map, especially in high frequency regions such as at depth discontinuities. The resulting image rendering artifacts are visually annoying. Conventional down/up samplers either use a low-pass filter or an interpolation filter to reduce the quality degradation. That is, the conventional filters combine the depths of several pixels covered by the filter in some way for each filtered pixel. That filtering "smears" or blurs depth discontinuities because it depends on multiple depths.

Because the depth video and image rendering results are sensitive to variations in space and time, especially at depth discontinuities, the conventional depth reconstruction are insufficient, especially for virtual image synthesis.

SUMMARY OF THE INVENTION

A method up-samples images in a reduced resolution video, wherein each image I(x, y) stores depths d at pixel locations (x, y). each depth image is scaled up to produce a corresponding up-scaled image. Then, image dilation, a median filter, image erosion, and a min-max filter are applied in order to produce a corresponding up-sampled image.

BRIEF DESCRIPTION OF THE DRAWINGS

FIG. 4A is a block diagram of a depth filter for one embodiment of the invention;

FIG. 4B is a block diagram of a depth filter for another embodiment of the invention;

FIGS. 6A-6C are block diagrams of a frequency close filter according to embodiments of the invention;

DETAILED DESCRIPTION OF THE PREFERRED EMBODIMENTS

The embodiments of our invention take as input a video 5 that includes a sequence of texture images and a corresponding sequence of depth images. Some embodiments of the invention concentrated on filtering of depth images and properly reconstructing the depth images in a reduced resolution video for the purpose of virtual image synthesis, while other embodiments of the invention describe methods for performing virtual image synthesis from the sequence of texture images and the sequence of corresponding depth images.

Figure 1:
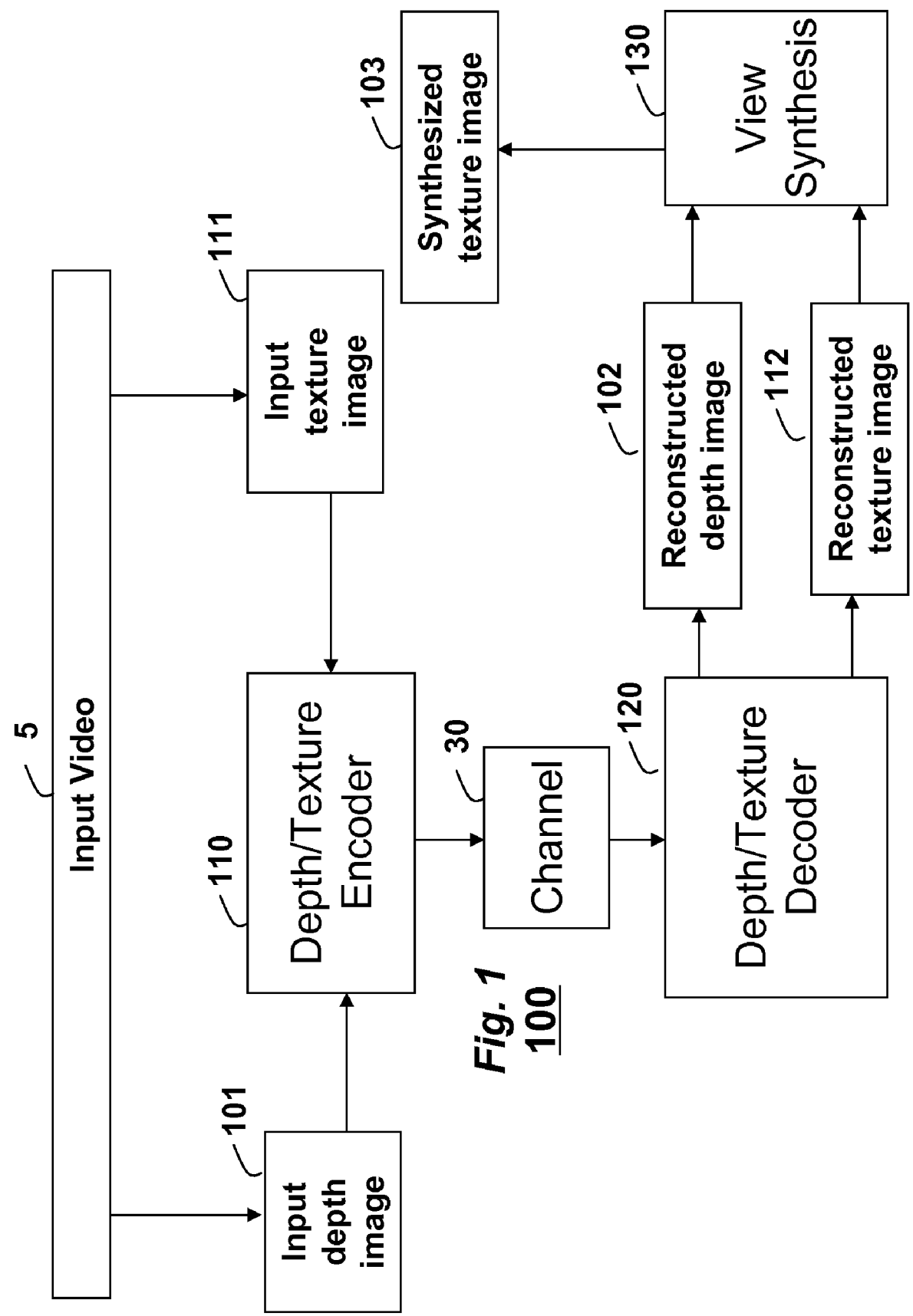
FIG. 1 is a block diagram of a video coding system including view synthesis using embodiments of the invention.

FIG. 1 shows an input video 5 including an input texture image 111 and input depth image 101 that is encoded by a texture/depth encoder 110 and passed through a channel 30 to a texture/depth decoder 120. The texture/depth decoder outputs a reconstructed texture image 112 and a reconstructed depth image 102, which are used as input to a view synthesis 130 to produce a synthesized virtual texture image 103.

Figure 2:
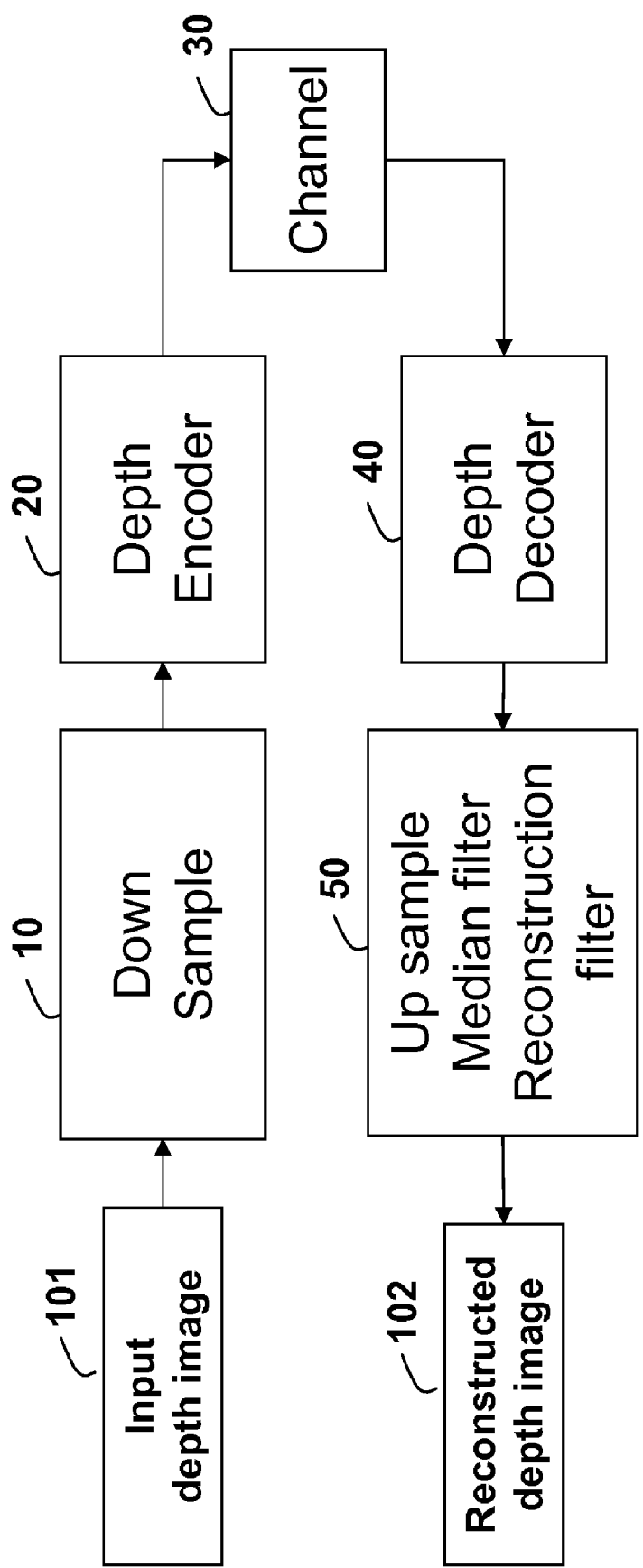
FIG. 2 is a block diagram of a coding system for depth images using embodiments of the invention.

FIG. 2 shows a method for depth encoding 200 each input depth image 101 of the input video. Before the encoding 20, the depth image is down sampled 10 to reduce a size of the depth image. The reduced resolution depth image is passed through a channel 30 to a depth decoder 40, wherein the images are reconstructed 30 by up sampling, median filtering and applying a depth reconstruction filter. The reconstructed depth images 102 can then be used for virtual image synthesis.

It is emphasized that the reconstruction process 30 is applied after the decoding 40 in system 200. FIG. 3 shows an alternative embodiment of the invention in which the reconstruction is within the prediction loop of an encoder 310 and a decoder 320.

Figure 3A:
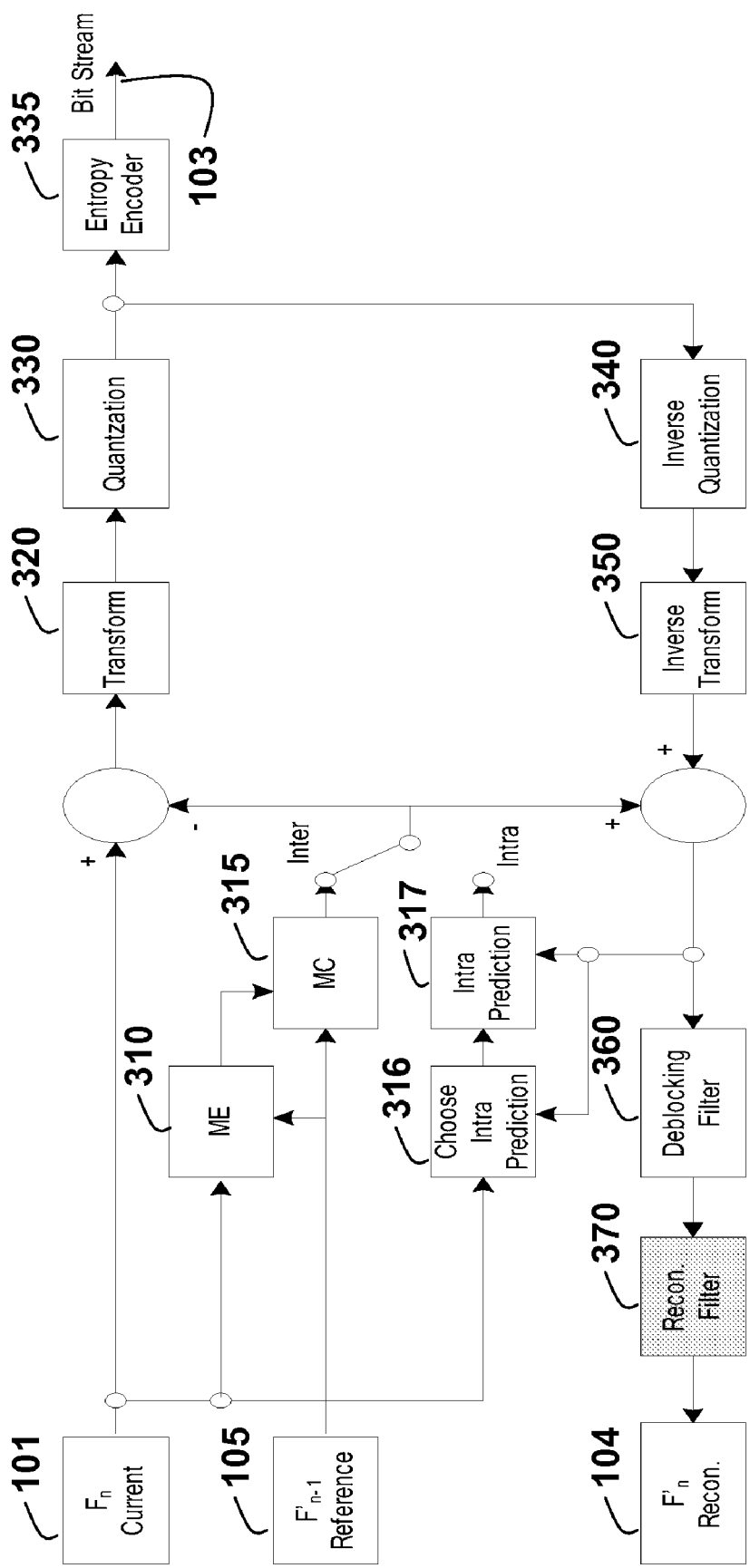
FIG. 3A is a block diagram of an encoder using embodiments of the invention.

FIG. 3A shows the video encoder 310, e.g., a modified H.264/AVC encoder, in greater detail. The encoder uses a depth reconstruction filter 370 according to embodiments of our invention. Input includes a current image 101 of an input video, and a reference image 105. Output includes an encode bitstream 103 and a reconstructed frame 104. For each frame or image of the input video, there is a corresponding depth image. The encoding process for the sequence of depth images is described. The encoding of texture is performed by conventional means.

The current depth image is predicted either by motion estimation (ME) 310 followed by motion compensation (MC) 315, or by intra-prediction 317 according to a selector 316. A difference between the current depth image and the predicted depth image is transformed 320, quantized 330, and entropy encoded 335 to produce a bitstream 103.

The output of the quantizer is inverse quantized 340, inverse transformed 350. The inverse transform is followed by a deblocking filter 360 the reconstruction filter 370 to produce the reconstructed depth image 104, which is also used by subsequent frames of the input video as a reference image 105.

Figure 3B:
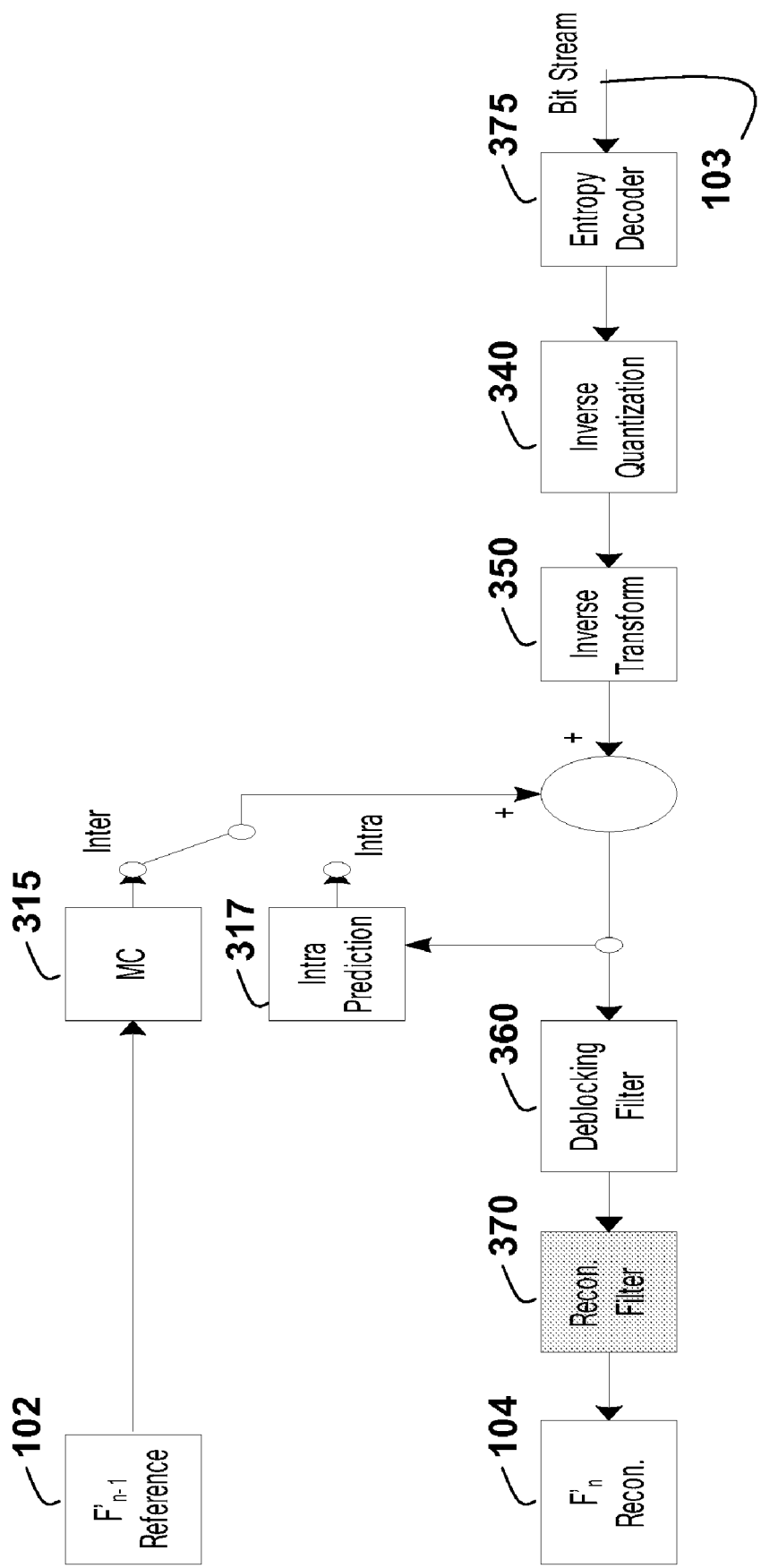
FIG. 3B is a block diagram of a decoder using embodiments of the invention.

FIG. 3B shows the corresponding decoder 320. Input is the reference image 105 and the bitstream 103. Output is the reconstructed depth image 104. The components include an entropy decoder 375, an inverse quantization 340, an inverse transform 350, a deblocking filer 360, a reconstruction filter 370, intra-prediction 317, and motion compensation 315. The deblocking may be optional, unless an exact decoding is desired.

With the exception of the entropy decoder 375, the decoder 320 is also included in the encoder 310. This is typical of any prediction-based video standards such as MPEG-2 and H.264. This guarantees that the identical previous frames are used by both the encoder and the decoder for predicting the current image.

Depth Reconstruction

Our filtering selects a single representative depth within a sliding window to recover missing or distorted depths, and to remove outliers without blurring structures in the depth images at depth discontinuities, e.g., object boundaries and edges.

Filter I

FIG. 4A shows one embodiment of our depth reconstruction filter 401 including an adaptive median filter 411 for removing decoding errors, an adaptive min-max filter 412 for recovering depth discontinuities from a decoded image, and a 3×3 median filter 413 for eliminating any remaining errors.

Adaptive Median Filter

The median filter 411 is a non-linear filter that is used to reduce noise. The median filter does not affect the median depth significantly as a mean filter. In addition, the median does not cause new unrealistic pixel depths when the filter straddles a depth discontinuity. However, the stability of the median filter depends on a window size, thus we adaptively adjust the window size.

The adaptive median filter adjusts the window size according to a quantization parameter (QP) used to encode the depth image because a distribution of depth decoding errors also depends on the QP. We classify the QP into three groups (low, mid, high) as described below, and apply the 3×3, 5×5, and 7×7 median filters for each group $QP_{low}$, for $QP_{min} < QP < \lceil QP_{max}/3 \rceil$, $QP_{mid}$, for $\lceil QP_{max}/3 \rceil < QP < \lceil 2 \cdot QP_{max}/3 \rceil$, and $QP_{high}$, for $\lceil 2 \cdot QP_{max}/3 \rceil < QP < QP_{max}$, where $QP_{min}$ and $QP_{max}$ are minimum and maximum QP depths, and $\lceil \ \rceil$ is a ceiling function that returns the smallest integer not less than $\lceil . \rceil$.

Adaptive Min-Max Filter

The adaptive min-max filter is the same size as the adaptive median filter. The filter is if $|\min(A)-I(x,y)| < |\max(A)-I(x,y)|$, then $I(x,y) = \min(A)$, else $I(x,y) = \max(A)$, where A is a rectangular region and I(x, y) is a pixel depth of the pixel at (x, y) in the regions, and the functions min and max return minimum and maximum depths.

It should be understood that in a depth image, the pixel intensity actually represents a depth. Thus, the term intensity and depth are synonymous herein Median Filter The final 3×3 median filtering corrects the outlier depths.

Filter II

FIG. 4B shows one embodiment of our depth reconstruction filter 402 which includes a frequency-close filter 421 and bilateral filter 422.

Frequency-Close Filter

Figure 5:
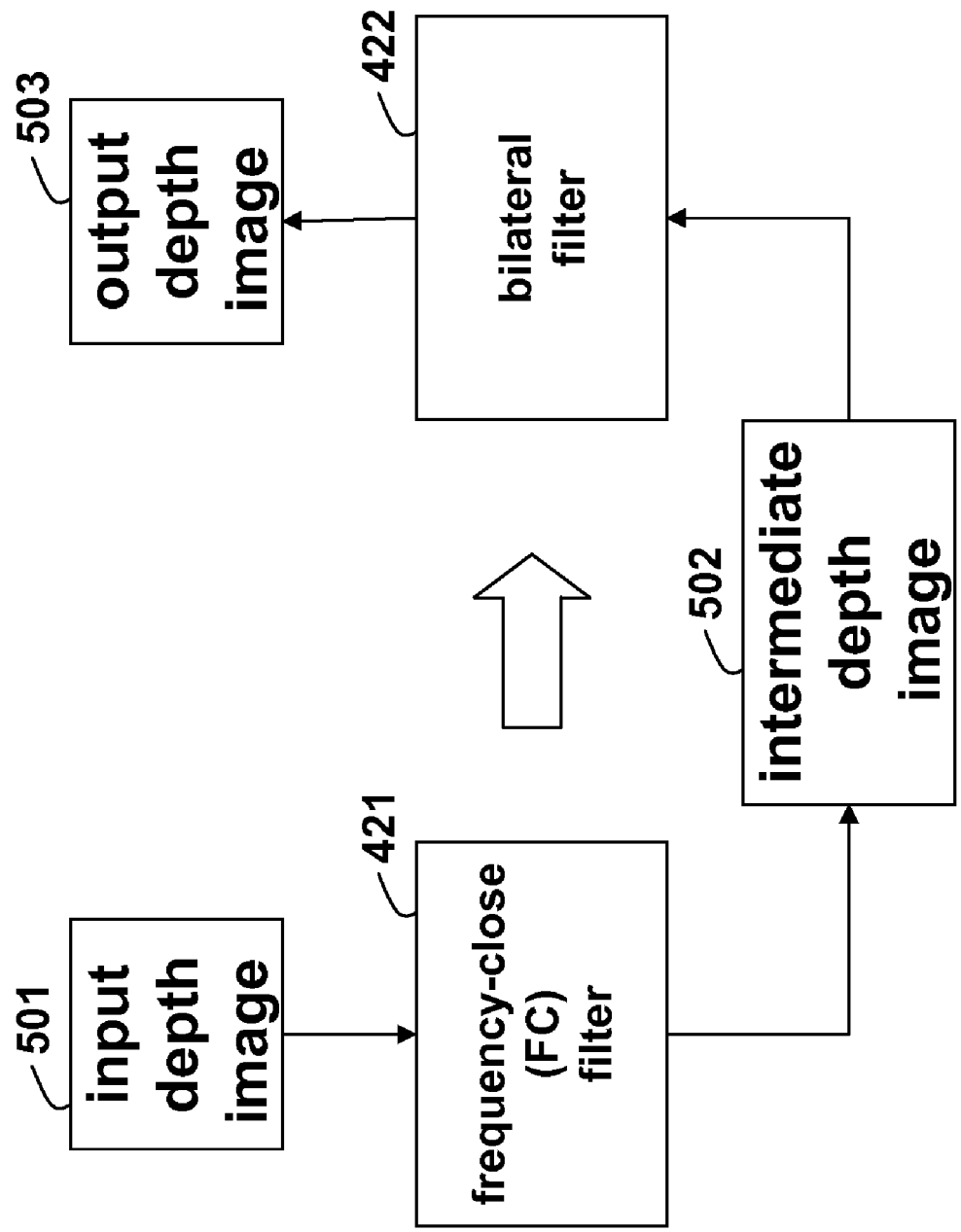
FIG. 5 is a flow diagram of a method for depth filtering according to embodiments of the invention.

As shown in FIG. 5, we first apply the frequency-close (FC) filter 421 to a preprocessed input depth image 501 to produce an intermediate depth image 502, which is then processed by the bilateral filter 422 to produce an output depth image 503.

The frequent-close filter is a non-linear filter defined as if $|FC_{first}(A)-I(x,y)| < |FC_{second}(A)-I(x,y)|$, then $I(x,y) = FC_{first}(A)$, else $I(x,y) = FC_{second}(A)$, where A represents a rectangular-shaped region of pixels, I(x, y) is the depth of the pixel at (x, y) within A. $FC_{first}$ and $FC_{second}$ are the pixel depths of the highest and the second-highest frequencies of occurrence of the depths within the regions A, respectively.

In other words, I(x, y) is assigned by the closer of the two representative depths $FC_{first}$ and $FC_{second}$ in the frequency-close filter.

Figure 6B:
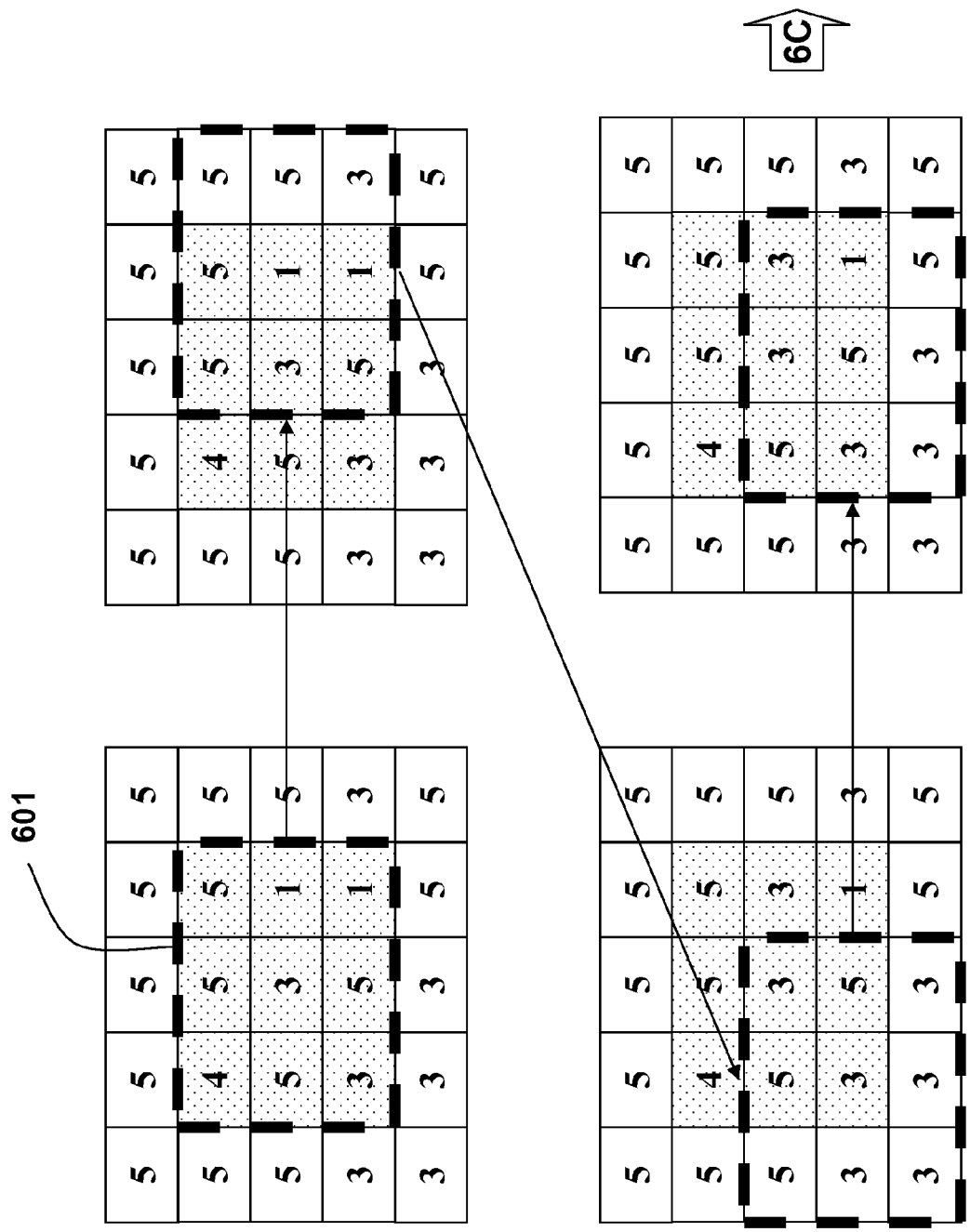
Figure 6C:
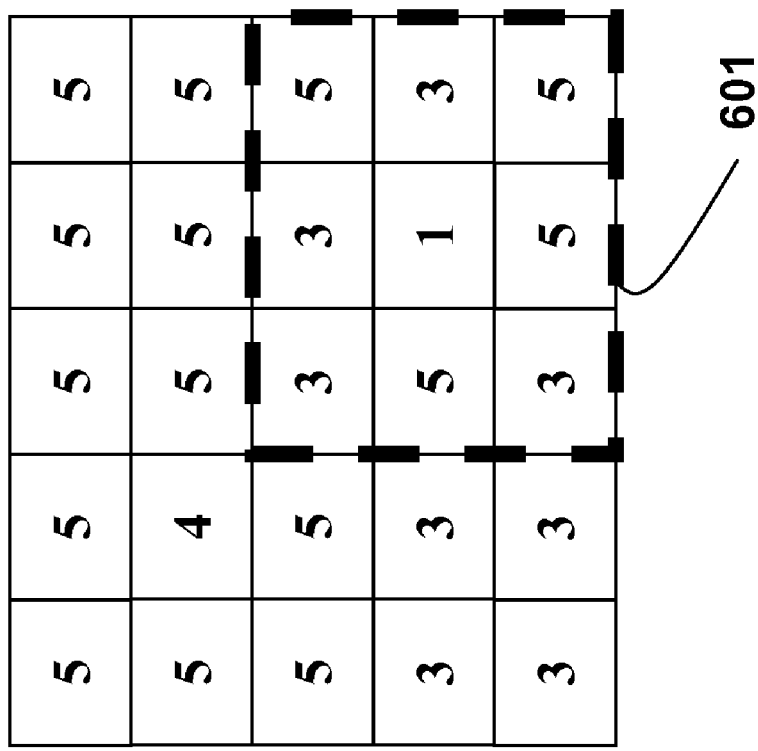

FIG. 6A-6C show an example 3×3 FC 601. The nine pixels are filtered one by one, from left-to-right and top-to-bottom in a scanning order by the moving window. The frequency of occurrence of each pixel depth within the window is counted, and the depth of the center pixel is changed to that of the highest or second highest frequent depth, depending on which is closer.

The frequent-close filter has following advantages over other linear filters. The filter correctly filters outlier pixels. A single pixel that does not have a similar depth as adjacent pixels does not affect the frequent-close depth significantly.

Because the frequent-close depth is the depth of only a single pixel in the neighborhood, the frequent-close filter does not cause unrealistic pixel depths when the filter straddles a depth discontinuity, e.g., an object boundary or edge.

Filter III

Frequency-Low-High Filter

Figure 6D:
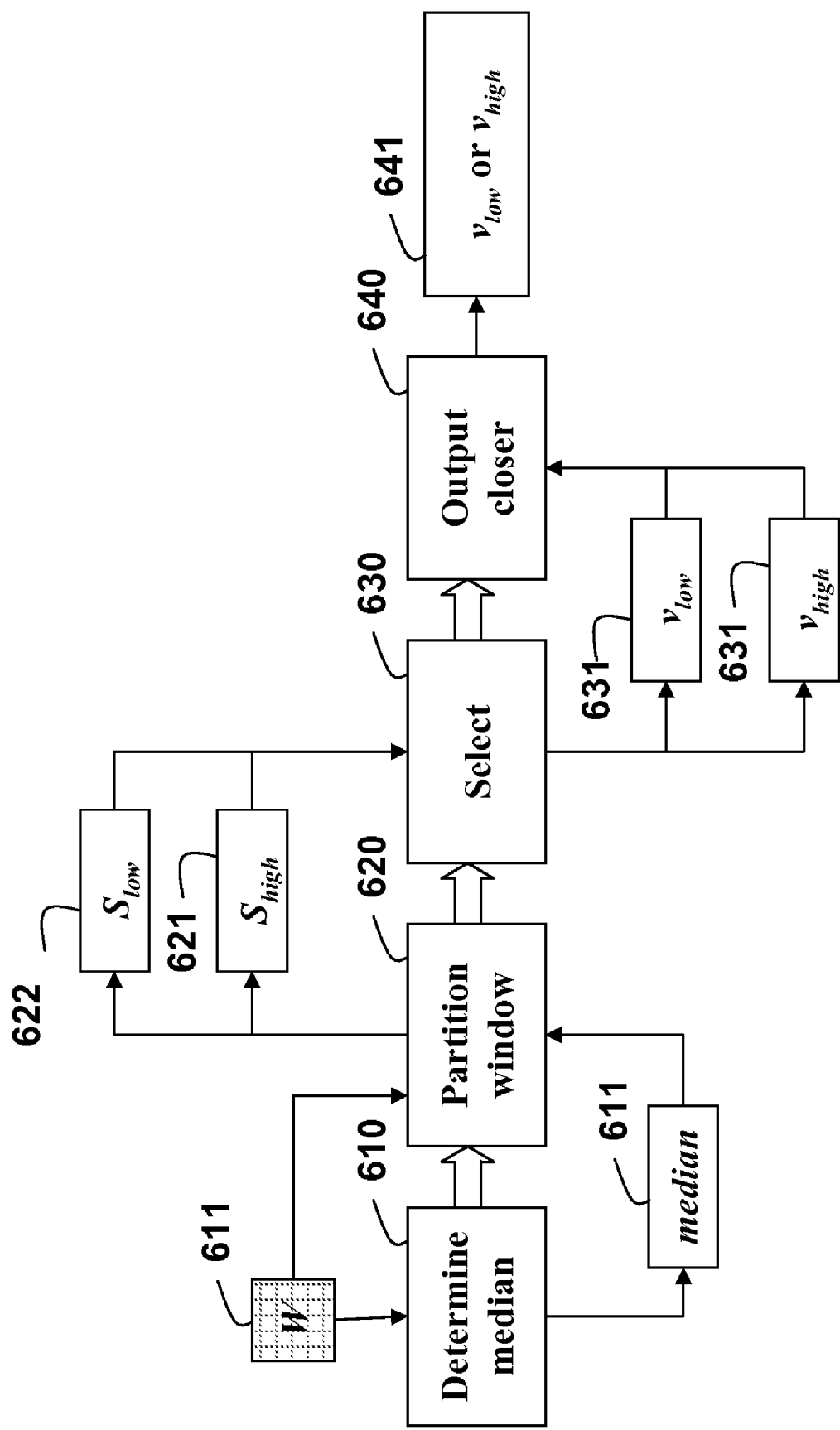
FIG. 6D is a block diagram of a frequency-low-high filter according to embodiments of the invention.

As shown in FIG. 6D, the basic operation of the frequency-low-high filter is as follows. A median 611 for the pixels in a filter window W 609 is determined 610. The pixels are then partitioned 620 into two sets, i.e., $S_{low}$ 621 and $S_{high}$ 622 using the median, such the set $S_{low}$ includes the pixels with depths less than the median, and the set $S_{high}$ includes the pixels with depths greater than the median.

For each set, select the depth with a highest frequency of occurrence in the sets, i.e., $v_{low}$ and for 'high' and 'low', respectively. The output 640 of the frequency-high-low filter for each center pixel in the window is the closer of $v_{high}$ and $v_{low}$ to the pixel depth.

More formally, we define the m×n window W(i,j) 609, where m and n are odd.

The pixels in the window W are sorted by their depths as $$\text{sort}(W(i,j)) = \{I_0, I_1, I_2 \ldots I_{m \times n - 1}\}, \text{ and}$$

the median depth 611 of the window W is $$\text{median}(W) = I_{(m \times n + 1)/2}.$$

The pixels in the window W are partitioned into the low set ($S_{low}$) and the high set group ($S_{high}$), according to median(W) as $$W(i, j) \in \begin{cases} S_{low}, & \text{if } W(i, j) < \text{median}(W) \\ S_{high}, & \text{if } W(i, j) > \text{median}(W). \end{cases}$$

For the pixel k in the set $S_{low}$, we calculate the probability of each depth v belonging to $S_{low}$ as $$P_{low}(v) = \frac{1}{(m \times n - 1)/2} \sum_{k=0}^{(m \times n - 1)/2} \delta[v, S_{low}(k)]$$

$$\text{with } \delta[a, b] = \begin{cases} 1, & \text{if } a = b \\ 0, & \text{otherwise.} \end{cases}$$

From the probabilities $P_{low}(v)$, we select the depth having a highest probability, and we define an depth $v_{low}$ as $$P_{low}(v_{low}) = \max\{P_{low}(v_0), P_{low}(v_1), \ldots P_{low}(v_k)\},$$

where the function max returns a largest depth.

That is, $v_{low}$ is the pixel depth with the highest frequency of occurrence among the set of pixel intensities, which are smaller than the median depth of the window W.

In a similar manner, we define $P_{high}(v)$ and $v_{high}$.

A representative depth for a given pixel is $$W(x, y) = \begin{cases} v_{low}, & \text{if } |W(x, y) - v_{low}| < |W(x, y) - v_{high}| \\ v_{high}, & \text{if } |W(x, y) - v_{low}| > |W(x, y) - v_{high}|, \end{cases}$$

where W(x, y) is a center pixel in the window W, and pixel W(x, y) is assigned a closer of the two representative depths $v_{low}$ and $v_{high}$.

Our frequent-low-high filter has following advantages over linear filters. The filter correctly processes the outlier pixels. A single pixel that does not have a similar depth as adjacent pixels does not affect the frequent-low-high depth significantly. Because the frequent-low-high depth is the depth of one of the pixels in the neighborhood, the depth does not cause unrealistic pixel depths when the filter straddles a depth discontinuity.

Bilateral Filter

After processing the reconstructed depth images using the filters described above, some errors that appear as artifacts can still remain at depth discontinuities. To reduce the remaining errors, we apply the bilateral filter 422 to the intermediate image 502 to produce the output depth image 503.

Figure 7C:
FIG. 7C-7D are prior art images according to embodiments of the invention.
Figure 7D:
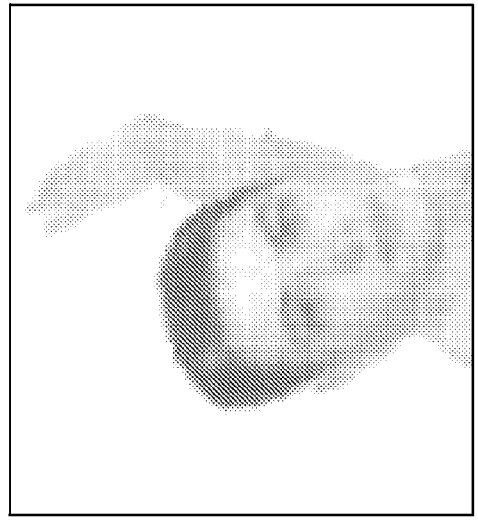
Figure 7A:
FIG. 7A-7B are prior art images.
Figure 7B:

It is clear that the images in FIGS. 7C and 7D according to the embodiments of the invention have fewer artifacts along the depth discontinuity than the prior art images 7A-7B.

Generally, the bilateral filter is an edge-preserving filter useful for image processing. Whereas many filters are convolutions in the image domain, solely based on geometric distances among pixels, the bilateral filter also takes the pixel depths into account. The bilateral filter replaces the depths of the pixels with a weighted average of adjacent pixels. However, the weights are determined not only based on the geometric distances, but also the differences in the pixel depths. The bilateral filter removes the remaining errors around the discontinuity, preserving the depth discontinuity by means of a non-linear combination of adjacent pixel depths. This is achieved by systematically limiting the effect of pixels across depth discontinuity.

Our bilateral filter has two parameters, color sigma ($\sigma_1$) and space sigma ($\sigma_2$), which determine the strengths of two filter kernels, each of which pertains to photometric and geometric distances of input pixels, respectively.

Down/Up Sampling

For down sampling a 2D image, a representative depth among the pixel depths in a certain window are selected. We select the median depth $$\text{img}_{down}(x,y) = \text{median}[\text{img}((x-1) \cdot d + 1 : x \cdot d, (y-1) \cdot d + 1 : y \cdot d)]$$

where d represents a down sampling factor, and $$\text{img}((x-1) \cdot d + 1 : x \cdot d, (y-1) \cdot d + 1 : y \cdot d) \text{ denotes a 2D array of the pixel depths in the window.}$$

Figure 8:
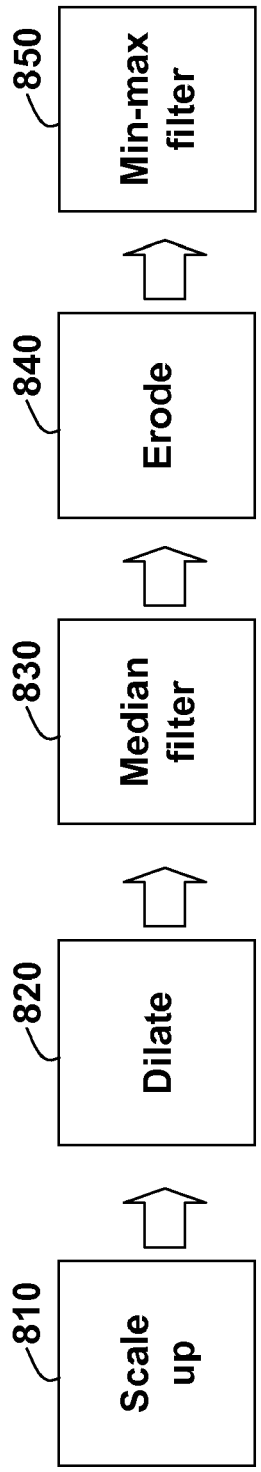
FIG. 8 is a block diagram of up-sampling according to embodiments of the invention.

As shown in FIG. 8, the up sampling 800 includes following steps: image up-scaling 810, image dilation 820, median filtering 830, image erosion 840, and min-max filtering 850.

Dilation and Erosion

Morphological dilation and erosion are well known terms in the art of image processing. The state of any given pixel in the output image is determined by applying a rule to the corresponding pixel and its neighbours in the input image.

For the dilation rule, the depth of the output pixel is the maximum depth of all the pixels in the neighborhood of the input pixel. Dilation generally increases the sizes of objects, filling in holes and broken areas, and connecting areas that are separated by small spaces. In gray-scale images, dilation increases the brightness of objects by taking the neighborhood maximum. With binary images, dilation connects areas that are separated by distance smaller than a structuring element, and adds pixels to the perimeter of each image object.

Erosion

For the erosion rule, the depth of the output pixel is the minimum depth of all the pixels in the neighborhood. Erosion generally decreases the sizes of objects and removes small anomalies by subtracting objects with a radius smaller than the structuring element. In grays-scale images, erosion reduces the brightness, and therefore the size, of bright objects on a dark background by taking the neighborhood minimum.

The image up-scaling is $$img_{up}((x-1)\cdot u+1:x\cdot u,(y-1)\cdot u+1:y\cdot u),$$

where u represents an up sampling factor, which is identical to d in the down-sampling. Because we use a simple approach in the up-sampling first step, blocking artifacts can be present in the intermediate image.

The steps 820, 830 and 840 remove the blocking artifacts. The output pixel depths of image dilation and erosion operations at (x, y), within an image region A using a structuring element B operating on A, are given in (3) and (4), respectively:

$$A \oplus B(x,y) = \max[A_B(x,y)], \text{ and} \quad (3)$$

$$A \ominus B(x,y) = \min[A_B(x,y)], \quad (4)$$

where $A_B$ represents the set of all the pixels in the area covered by the structuring element B centred at (x, y) and max [.] and min [.] represent the maximum and minimum of the pixel depths in the set within [.], respectively. That is, the depth of the output pixel by dilation at (x, y) is the maximum depth of all the pixels in $A_B$.

Similarly, the depth of the output pixel by erosion at (x, y) is the minimum depth of all the pixels in AB. We use a circular structuring element with disk radius set to $u\sqrt{2}$ in this invention. We use a disk-shaped structuring element with a radius $u\sqrt{2}$.

The min-max filtering, which recovers depth discontinuities, is if $|\min(A)-I(x,y)|<|\max(A)-I(x,y)|$, then $I(x,y)=\min(A),$ else $I(x,y)=\max(A),$ where A is a 3×3 rectangular region and I(x, y) is the depth of the pixel at (x, y) within A.

Virtual Image Synthesis

As define herein, a virtual image is an image that is not in the input video, e.g., an image of the scene from a camera view point not present while acquiring the input video.

Figure 9:
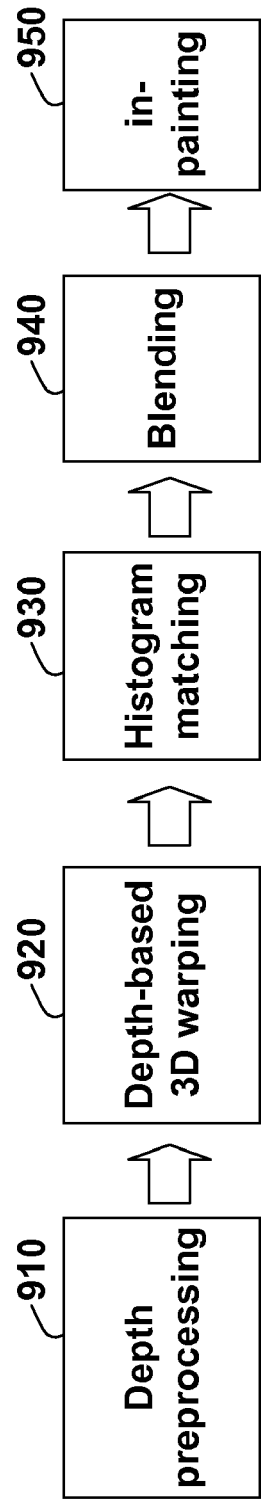
FIG. 9 is a block diagram of virtual image synthesis according to embodiments of the invention.

As shown in FIG. 9, our synthesis has the following steps: depth preprocessing 910, depth-based 3D warping 920, depth-based histogram matching 930, base plus assistant image blending 940, and depth-based in-painting 950, all described in greater detail below.

The depth preprocessing is performed on the acquired scene depth data to correct errors and enhance the spatial and temporal consistencies of depths. The depth-based 3D warping corrects the discontinuity problem in the direct warping of textures caused by round-off errors. The depth-based warping uses camera parameters that describe a geometry of a scene.

The depth-based histogram matching reduces illumination differences between two reference images.

The base plus assistant image blending blends the two 3D warped reference images against the inaccuracy of the depth and camera parameters to produce the virtual image.

The depth-based in-painting fills any remaining holes in the virtual image using a depth-based in-painting.

Figure 11:
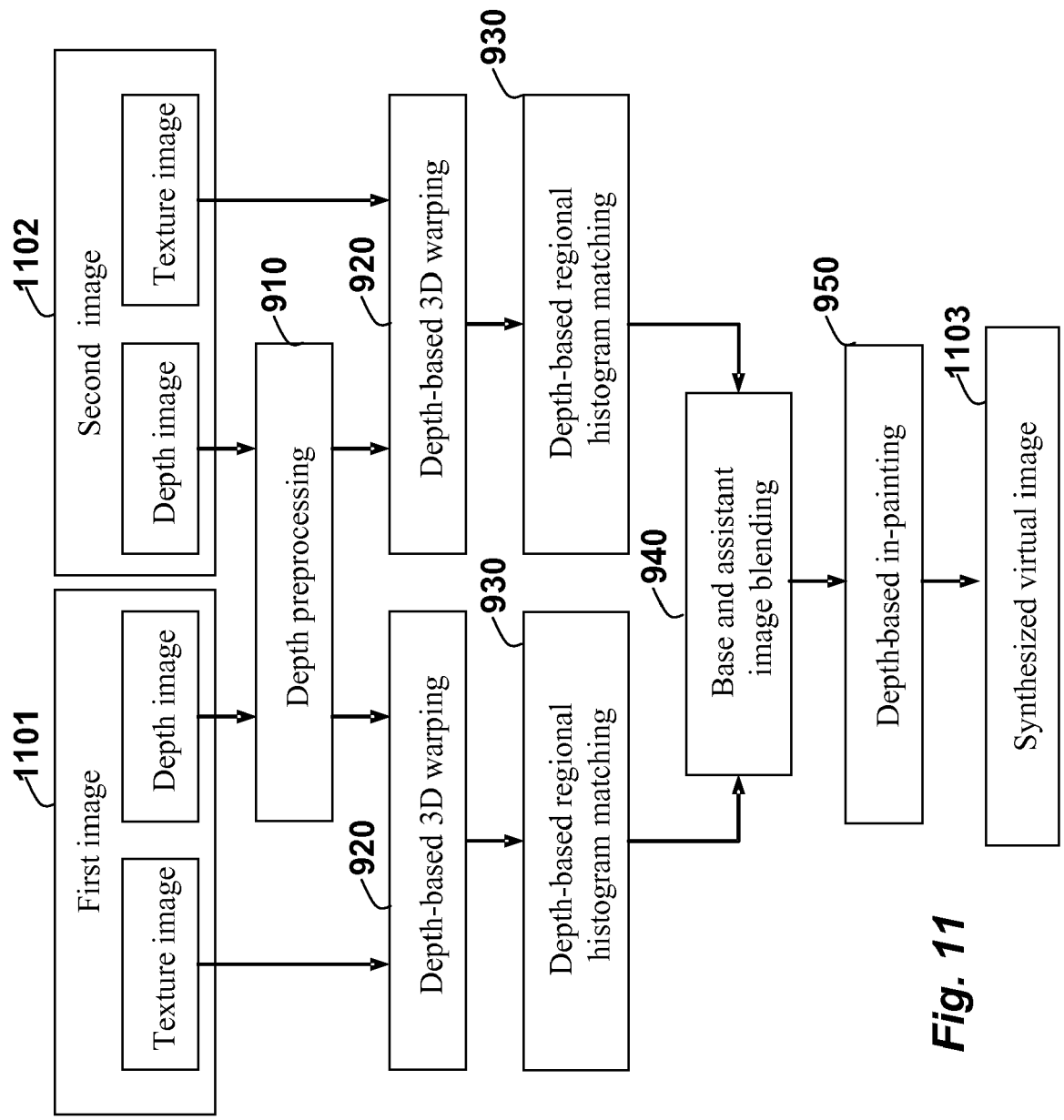
FIG. 11 is a block diagram of virtual image synthesis according to embodiments of the invention.

FIG. 11 shows the steps for a first image 1101 and a second image 1102 to produce a synthesized virtual image 1103. Typically, the first and left images are to the left and right of the image for the desired virtual image.

Depth Preprocessing

In general, the depth data can be acquired using a depth or range camera, and computer graphics tools, or determined by a preferred depth estimation procedure.

Figure 10:
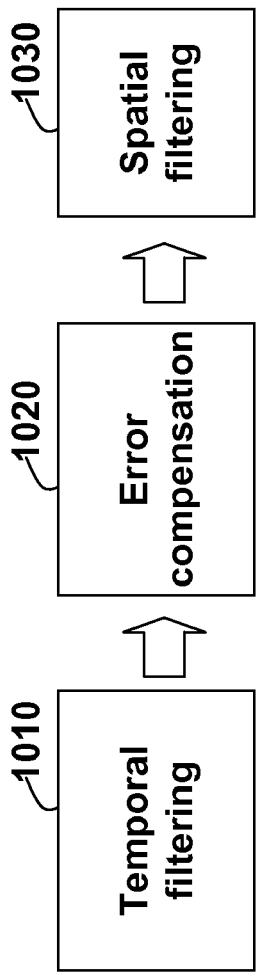
FIG. 10 is a block diagram of depth preprocessing according to embodiments of the invention.

As shown in FIG. 10, the depth preprocessing includes: temporal filtering 1010, initial error compensation 1020, and spatial filtering 1030. We apply a median filtering instead of averaging filter because averaging filter results in new pixel depths which do not exist in the initial depth image, which degrades the quality of the rendering.

As a first step, we apply a 1D median filter along the co-located pixels of consecutive depth image frames to reduce temporal inconsistency of depths belonging to the same object or background. The median filter is $$Y_{i,j,t} = \begin{cases} \text{median } (J_{i,j,t}), & \text{for max } (J_{i,j,t}) - \min(J_{i,j,t}) <= \gamma \\ X_{i,j,t}, & \text{otherwise,} \end{cases}$$

where $X_{i,j,t}$ is the depth of a pixel at the spatial location (i,j) at time t, $j_{i,j,t}$ is a set of pixels in a 3×3×3 window centered around the spatio-temporal location (i,j, t), and y is a threshold depth to determine whether or not the filter is applied.

The next step compensates for an initial error, which can be caused by an erroneous merge of foreground and background in the typical depth estimation process. Usually, the error occurs when the foreground and the background have similar textures, which are easy to distinguish visually, but difficult to remove.

We correct the initial errors by using image dilation and erosion defined as follows:

$$A \oplus B(x, y) = \max_{(x,y)\in B} [A_B(x, y)],$$

and $$A \ominus B(x, y) = \min_{(x,y)\in B} [A_B(x, y)],$$

where A represents the image and B is structuring element which operates on the A. The $A_B$ is a masked region with B and (x, y) is a pixel in the image A. We use a disk-shaped structuring element with disk a radius of five.

The final step filters outliers and removes noise in the estimated depth image using a 2D median filter. The 5×5 filter is $Y_{i,j}$=median $(J_{i,j})$, where $J_{i,j}$ is a set of pixels in the 5×5 window centered around the location (i, j).

Depth-Based 3D Warping

Most conventional virtual image synthesis methods warp the texture images using corresponding depth maps. However, a direct 3D warping of texture images of adjacent images into the virtual image plane often causes false black-contours in the synthesized virtual image. These contours are caused by round-off errors involved with the integer representation of the coordinate of virtual image, as well as by spurious initial depths.

After the depth image corresponding to the virtual image is obtained, by inverse warping, we can use the depth image to locate the proper texture intensities from an adjacent images without generating false black-contours in the synthesized virtual image. To obtain the depth image corresponding to the virtual image, we first warp the depth images of the corresponding reference images. In 3D warping, pixels in the reference image are back-projected to 3D spaces, and reprojected onto the target virtual image using camera parameters describing the geometry of the scene.

A back-projection of a point (u, v, 1) in the reference image to the coordinate (x, y, z) in the 3D space is $$(x,y,z)^T = R_{ref} A_{ref}^{-1}(u,v,1)^T d_{u,v} + t_{ref},$$

where A, R, and t are camera parameters of the reference image, d represents the depth of a point in the 3D space that needs to be back-projected, and T is the transpose operator.

Then, we locate the corresponding coordinate (l, m, n) in the virtual image reprojected from the above 3D point as $$(l,m,n)^T = A_{vir} R_{vir}^{-1}\{(x,y,z)^T - t_{vir}\},$$

where A, R, and t are camera parameters of the virtual image. The coordinate (l, m, n) is normalized to (l/n, m/n, 1), and then represented as an integer-coordinate (U, V) in the virtual image.

In order to remove the false black-contours appearing in the warped depth image for the exactly same reason as with the texture warping, we apply a median filtering.

Depth-Based Histogram Matching

In case we have two reference images for the virtual image synthesis, we can first synthesize two 3D warped images, i.e., one from each image 1101-1102. Before blending these two warped images, we apply a histogram matching to reduce the illumination and color differences between the two images which may cause inconsistency of the synthesized image.

The histograms of the pixel intensities of the two 3D warped reference images are adjusted to have a similar distribution. This process is applied for each component of the RGB data format in which the pixel intensities are expressed.

The two 3D warped images are modified so that holes at identical corresponding locations, and then the median filter is applied to reduce noise. As a result, the two warped images similar textures except for slight differences in their illuminations. This modification greatly increases the accuracy of histogram matching as the existence of holes in the images has a huge impact on the shape of the histogram.

Next, we construct the histograms of the warped first and second images.

Let $y_L[m,n]$ denote the amplitude of the first image. Then, the histogram is $$h_L[v] = \frac{1}{w \cdot h} \sum_{m=0}^{h-1} \sum_{n=0}^{w-1} \delta[v, y_L[m,n]]$$

with $\delta[a,b] = \begin{cases} 1, & \text{if } a = b \\ 0, & \text{otherwise,} \end{cases}$ where w denotes the image width and h is the image height. The intensity of v ranges from 0 to 255. Two steps are necessary to generate the mapping function M. First, the cumulative histogram $C_L[v]$ of the left image is constructed as $$C_L[v] = \sum_{i=0}^{v} h_L[i].$$

The histogram $h_R[v]$ and cumulative histogram $C_R[v]$ of the right image are constructed in the same manner.

Based on the cumulative histograms, we construct a cumulative histogram $C_V[v]$ for virtual image using $$C_V(v) = \alpha C_L(v) + (1-\alpha) C_R(v),$$

where $C_L$ and $C_R$ are the cumulative histograms for the warped left and right images. Generally, the weighting factor α is based on the baseline distance $$\alpha = \frac{|t_V - t_L|}{|t_V - t_L| + |t_V - t_R|},$$

where t is a translation vector for each image.

Figure 12B:
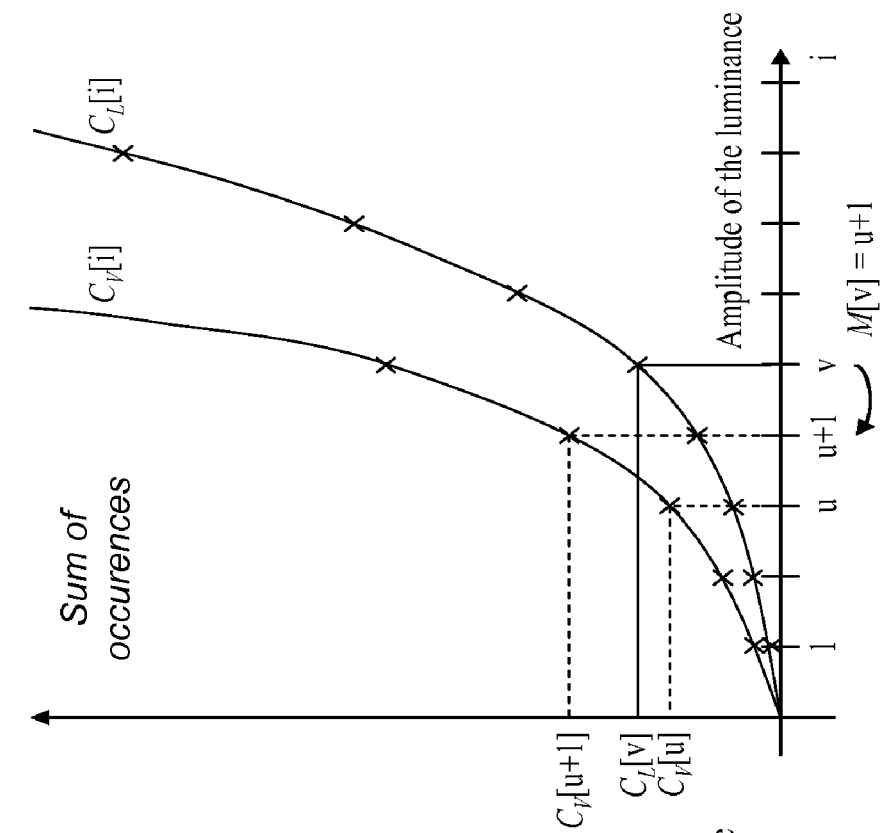
FIG. 12A-12B are graphs according to embodiments of the invention.
Figure 12A:
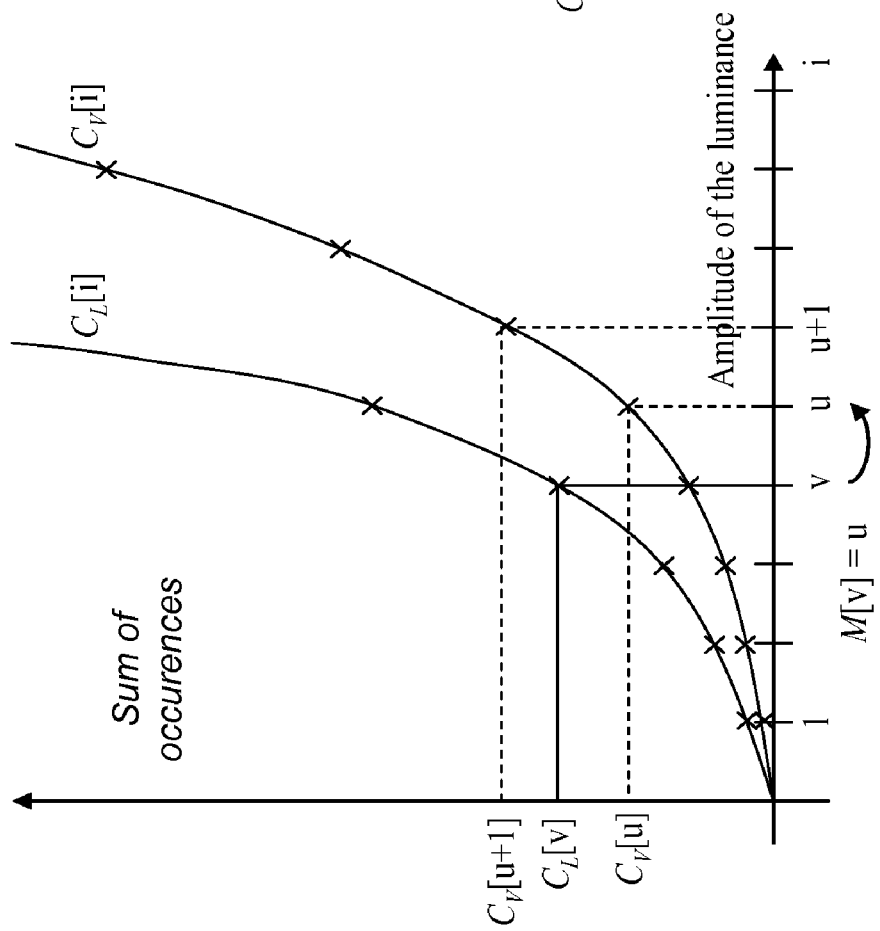

As shown in FIG. 12, the mapping function between the left image and the virtual image is obtained by matching the number of occurrences in the reference image to that of occurrences in the virtual image $$M[v] = \begin{cases} u, & \text{for } C_V[u] < C_L[v] \leq C_V[u+1] \,\&\, C_V[v] <= C_L[v] \\ u+1, & \text{for } C_V[u] < C_L[v] \leq C_V[u+1] \,\&\, C_V[v] > C_L[v]. \end{cases}$$

The mapping function is applied to the left image $y_L[m, n]$, and the right image $y_r[m, n]$, resulting in the histogram-matched images $y_{HML}[m, n]$ and $y_{HMR}[m, n]$ as $$y_{HML}[m,n] = M[y_L[m,n]], \text{ and}$$

$$y_{HML}[m,n] = M[y_L[m,n]].$$

In general, the different lighting for each camera causes illumination and color differences, and differently affects each object and color component. We apply the histogram matching regionally, and the regions are partitioned using depths.

Base Plus Assistant Image Blending

Two 3D warped images can be combined using a weighted (α) sum $$I_V(u,v) = \alpha I_L(u,v) + (1-\alpha) I_R(u,v),$$

where $I_L$ and $I_R$ are the 3D warped reference texture images and $I_V$ is the virtual image.

However, due to camera parameters, inconsistent depths and intensities from the reference images can contribute to the warped image and often leads to double edge artifacts and smoothing.

In order to avoid that a problem, we define a base image and an assistant image for image blending. The base image is the main reference image from which most of the pixel intensities are warped. The assistant image is used as a supplementary reference image for in-painting. The closer reference image to the virtual image is selected as the base image $I_B$, and the other image is selected as the assistant image $I_A$, and the virtual image $I_V$ is $$I_V(u,v) = \alpha I_B(u,v) + (1-\alpha) I_A(u,v),$$

where α is 1 for non-hole regions and 0 for hole regions in the base image $I_B$.

In-Painting Using Depths

Image blending efficiently fills up most disoccluded. Disocclusion regions are areas that cannot be seen in the reference image, but exist in the synthesized image. However, some holes still remain due to remaining disocclusion regions and wrong depths.

Many existing in-painting methods use image interpolation or hole-filling techniques, and fill up the remaining holes using adjacent pixels based on a geometrical distance.

Figure 13:
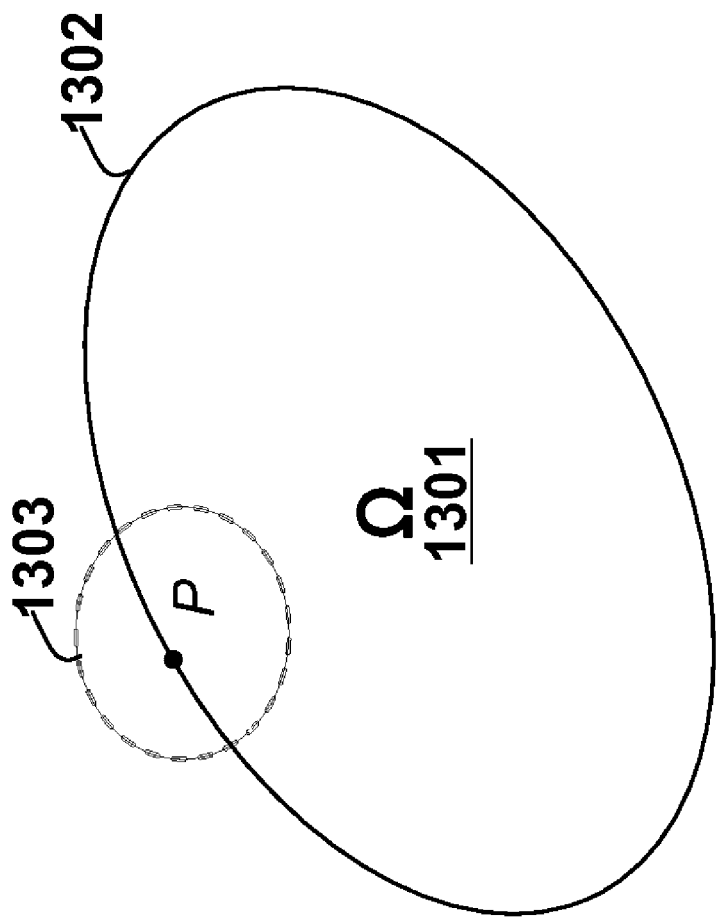
FIG. 13 is a schematic of in-painting according to embodiments of the invention.

Generally as shown in FIG. 13, a region Ω 1301 to be in-painted has a boundary ∂Ω 1302. A pixel p belonging to the region Ω is in-painted using pixels in an adjacent region $B_\epsilon(p)$ 1303.

However, it makes more sense to fill up the holes using background pixels rather than foreground pixels as the holes in virtual image synthesis correspond to the disoccluded area, which belongs to the background by definition.

Therefore, our in-painting prefers the background pixels over the foreground pixels as follows $$p_{fg} \in \partial\Omega_{fg} \rightarrow p_{bg} \in \partial\Omega_{bg}$$

$$B_\epsilon(p_{fg}) \rightarrow B_\epsilon(p_{bg}),$$

where f and $b_g$ represent the foreground and the background, respectively.

In other words, when $\partial\Omega$ of a certain hole belongs to both the foreground and the background, we replace the pixel intensities of the boundary region facing the foreground with those of the background region located on the opposite side of the hole so that the holes be eventually fills with intensities corresponding to the background area by an in-painting.

To determine whether a particular pixel on the hole boundary belongs to the foreground or the background, we use corresponding depth data. In other words, for the two pixels on opposite sides of the boundary, we regard the pixel having the larger depth as belonging to the foreground, and the smaller depth the background.

Effect of the Invention

The invented depth reconstruction filter includes a frequent-close filter followed by a bilateral filter. The frequent-close filter is non-linear, and takes into consideration characteristics of depth images to reduce coding errors, while the bilateral filter is adapted to reduce the remaining outliers, while preserving depth discontinuities.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for up sampling images in a reduced resolution video, wherein each image I(x, y) stores depths d at pixel locations (x, y), comprising a processor for performing steps of the method, comprising the steps of:
   scaling up, each depth image to produce a corresponding up-scaled image;
   applying image dilation to each up-scaled image to produce a corresponding dilated image;
   applying a median filter to each dilated image to produce a corresponding median image;
   applying image erosion to each median image to produce a corresponding eroded image; and
   applying a min-max filter to each eroded image to produce a corresponding up-sampled image.

2. The method of claim 1, wherein the up-scaling is $$img_{up}((x-1)\cdot u+1:x\cdot u, (y-1)\cdot u+1:y\cdot u),$$

where u represents an up-sampling factor.

3. The method of claim 1, wherein the image dilation and the image erosion respectively are $$A \oplus B(x,y) = \max[A_B(x,y)], \text{ and}$$

$$A \ominus B(x,y) = \min[A_B(x,y)],$$

where $A_B$ represents a set of all the pixels an the area covered by a structuring element B centered at the location (x, y) and max [.] and min [.] represent a maximum and a minimum of the depth the set within [.], respectively.

4. The method of claim 3, wherein the structuring element has a radius to $u\sqrt{2}$.

5. The method of claim 1, wherein the min-max filter assigns a minimum depth of the pixels in a window when an absolute value of a difference between a minimum depth of the pixels in the window and the depth at the center of the window is less than an absolute value of a difference between a maximum depth in the window and the depth at the center of the window.

6. The method of claim 1, wherein the min-max filter assigns a maximum depth of the pixels in a window when an absolute value of a difference between a minimum depth in the window and the depth at the center of the window is greater than or equal to an absolute value of a difference between the maximum depth in the window and the depth at the center of the window.

7. The method of claim 1, further comprising:
   synthesizing virtual images using the depth images.

8. The method of claim 1, in which the up-sampling of the depth image is performed on a reconstructed depth image that is an output of a decoder.

9. The method of claim 1, in which the up-sampling of the depth image is performed on a depth image within the prediction loop of a decoder to produce a reference image that is used for prediction of a subsequent depth image to be decoded.

* * * * *